United States Patent [19]

Ueyama et al.

[11] Patent Number: 5,842,053
[45] Date of Patent: Nov. 24, 1998

[54] IMAGE SHAKE CORRECTION DEVICE FOR OPTICAL SYSTEM AND APPARATUS HAVING IMAGE SHAKE CORRECTION DEVICE OPTICAL SYSTEM

[75] Inventors: Masayuki Ueyama, Takarazuka; Tetsuro Kanabara, Sakai, both of Japan

[73] Assignee: Minolta Co., Ltd., Osaka, Japan

[21] Appl. No.: 898,961

[22] Filed: Jul. 23, 1997

[30] Foreign Application Priority Data

Jul. 24, 1996 [JP] Japan .................................. 8-212180
Jul. 24, 1996 [JP] Japan .................................. 8-212781

[51] Int. Cl.$^6$ .................................................. G03B 17/00
[52] U.S. Cl. ............................................. 396/55; 348/208
[58] Field of Search ........................ 396/52, 55; 348/208

[56] References Cited

U.S. PATENT DOCUMENTS

| | | |
|---|---|---|
| 4,780,739 | 10/1988 | Kawakami et al. ..................... 396/54 |
| 4,864,339 | 9/1989 | Gross et al. . |
| 5,153,633 | 10/1992 | Otani . |
| 5,589,723 | 12/1996 | Yoshida et al. . |
| 5,678,067 | 10/1997 | Kitagawa et al. ........................ 396/55 |
| 5,748,995 | 5/1998 | Kitagawa et al. ........................ 396/52 |
| 5,768,016 | 6/1998 | Kanbara ................................... 396/55 |

FOREIGN PATENT DOCUMENTS 08043872  2/1996  Japan .

*Primary Examiner*—Russell E. Adams
*Attorney, Agent, or Firm*—McDermott, Will & Emery

[57] ABSTRACT

An image shake correction device and an apparatus having the image shake correction device which are capable of correcting image shake due to shaking of an optical apparatus such as camera by moving a correcting lens disposed just after a diaphragm of a camera lens dependently on the detected camera shake displacement. An X-axis actuator and Y-axis actuator is provided on a lens barrel of the correcting lens, and driven alternately to move the X-axis direction and Y-axis direction respectively based on driving time ratio of each actuator calculated dependently on the detected camera shake displacement.

10 Claims, 11 Drawing Sheets

IMAGE SHAKE CORRECTION DEVICE FOR OPTICAL SYSTEM AND APPARATUS HAVING IMAGE SHAKE CORRECTION DEVICE OPTICAL SYSTEM

BACKGROUND OF THE INVENTION

1. Field of the Invention

This invention relates to an image shake correction device for optical system and an apparatus having the image shake correction device for optical system, and more particularly relates to an image shake correction device for optical system and an apparatus having the image shake correction device for optical system which employ an actuator having an electro-mechanical transducer for driving an image shake correction element, for example, lens.

2. Description of the Prior Art

Heretofore, a vibration proof optical system in which two correcting lenses disposed just after a diaphragm of a camera lens is driven eccentrically in a plane perpendicular to the optical axis direction has been known as a means for correcting image shake on the imaging plane due to camera shake when taking a picture. In lens devices provided with such optical system, a driving mechanism which is used exclusively for driving a correcting lens in the proper direction is incorporated.

The correcting lens driving mechanism of the above-mentioned vibration proof optical system has employed a driving mechanism comprising a DC motor and mechanical reduction gear, in such mechanism, not only a motor occupies a large space but also a mechanical reduction gear incorporated with a mechanism for excluding back lash occupies a large space, therefore, a lens-barrel becomes large inevitably, and in addition, generation of noise due to operation of a mechanical reduction gear degrades disadvantageously the quality of the product. In view of such problems, the inventors of the present invention proposed previously a correcting lens driving mechanism which employs an actuator using a piezoelectric transducer as a driving unit (refer to Japanese Laid Open Patent No. Hei 8-43872).

FIG. 13 is a perspective view for illustrating the structure of the above-mentioned correcting lens driving mechanism, in the drawing, an actuator 122 for moving eccentrically the first lens group L1 is disposed in parallel to X-axis and an actuator 123 for moving eccentrically the second lens group L2 is disposed in parallel to Y-axis. The actuator 122 and the actuator 123 have the same mechanism, and each of which comprises a piezoelectric transducer 132 (142), driving shaft 131 (141), a coupling member 112a (113a) having lens holder frame 112 (113) and friction-coupled with driving shaft 131 (141), a pad 112c (113c), and a plate spring 112d (113d) for adjusting friction-coupling force.

Position in X-axis direction of the first lens group L1 is detected by an X-axis direction position sensor 135 mounted on the lens holder frame 112, and position in Y-axis direction of the second lens group L2 is detected by a Y-axis direction position sensor 145 mounted on the lens holder frame 113. As the X-axis direction sensor 135 and Y-axis direction position sensor 145, known position sensors, for example, a magneto-resistive sensor having a sensor 135 (145) consisting of a magneto-resistive element mounted on the lens holder frame 112 (113) which detect magnetism of a magnetized rod 136 (146) having magnetic poles with a certain interval which is disposed along the extension of the lens barrel not shown in the drawing are employed. Alternately, various other position sensors may be employed.

Next, driving operation of the first lens group L1 having the actuator 122 and driving operation of the second lens group L2 having the actuator 123 are described with reference to FIG. 13.

For example, based on camera shake displacement calculated from the output of the camera shake sensor, which is not shown in the drawing, for detecting acceleration in X-axis and Y-axis direction of a camera, and the lens position detected with the above-mentioned position sensor, a driving distance of the correcting lens is calculated, and based on the calculated driving distance a driving pulse is applied to the piezoelectric transducer of the actuator to drive a correcting lens.

For example, when driving pulses each of which has a waveform comprising a slow rising portion and subsequent rapid falling portion as shown in FIG. 14 are applied to the piezoelectric transducer 132 of the actuator 122, the slow rising portion of a driving pulse causes slow expansion deformation of the piezoelectric transducer 132 in the thickness direction, and results in displacement of the driving shaft 131 in the direction of an arrow-a. The lens holder frame 112 which is friction-coupled with the driving shaft 131 with interposition of the coupling member 112a is moved in the direction of the arrow-a, and the first lens group L1 is displaced in the positive direction along X-axis as shown with the arrow-a.

The rapid falling portion of a driving pulse causes contraction deformation of the piezoelectric transducer 132 in the thickness direction and results in displacement of the driving shaft 131 in the opposite direction to the arrow-a. When, the lens holder frame 112 which is friction-coupled with the driving shaft 131 with interposition of the coupling member 112a remains substantially at the position because inertia force of the lens holder frame 112 overcomes the friction-coupling force between the lens holder frame 112 and the driving shaft 131, therefore the first lens group L1 does not move.

The word "substantially" described herein above means the motion including that the lens holder frame 112 moves slidingly with sliding between the coupling member 112a of the lens holder frame 112 and the driving shaft 131 in the direction of the arrow-a or in the opposite direction, and overall the lens holder frame 112 is displaced in the direction of the arrow-a due to the difference in driving time. The mode of motion is dependent on the given friction condition.

By applying driving pulses having the above-mentioned waveform continuously, the first lens group L1 can be moved in the X-axis direction continuously.

By applying driving pulses each of which has a waveform comprising a rapid rising portion and subsequent slow falling portion to the piezoelectric transducer 132, the first lens group L1 is moved in the negative direction of the X-axis, namely in the opposite direction to the arrow-a.

The same is true for driving of the second lens group L2 moved by means of the actuator 123, by applying driving pulses to the piezoelectric transducer 142 of the actuator 123, the second lens group L2 can be displaced in Y-axis direction as shown with the arrow-b (negative and positive direction)

By employing the lens correction driving mechanism having a driving unit of the above-mentioned piezoelectric transducer actuator, the driving mechanism does not occupy a large space unlike a conventional driving mechanism comprising a DC motor and mechanical reduction gear, the lens barrel can be made small sized and light weight, and operation is not accompanied by noise, thus the driving mechanism has such excellent performance, however, a smaller sized driving mechanism comprising less components has been desired to be realized.

SUMMARY OF THE INVENTION

It is the principal object of the present invention to provide a small sized and light weight image shake correction device for optical system and an apparatus having such image shake correction device for optical system.

It is another object of the present invention to provide a small sized and light weight image shake correction device and an apparatus having such image shake correction device for driving a correction component using a driving device which utilizes an electromechanical transducer.

It is yet another object of the present invention to provide a small sized and light weight image shake correction device and an apparatus having such image shake correction device for correcting image displacement by way of driving a correcting lens dependently on the detected camera shake displacement on a plane perpendicular to the optical axis of the optical device using the driving device which utilizes an electromechanical transducer as a driving unit.

These and other object, features and advantages of the invention will become more apparent upon a reading of the following description and appended drawings.

DETAILED DESCRIPTION OF THE PREFERRED EMBODIMENTS

Figure 1:
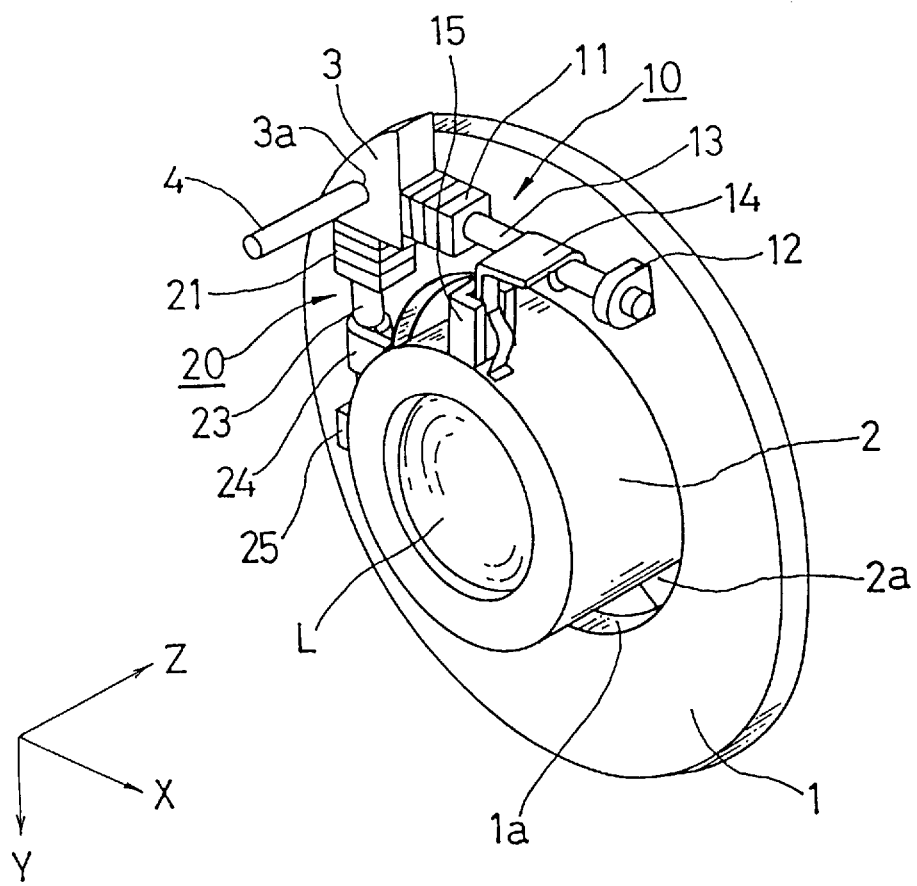
FIG. 1 is a perspective view of a correction lens driving mechanism for an illustrating image shake correction device.
Figure 2:
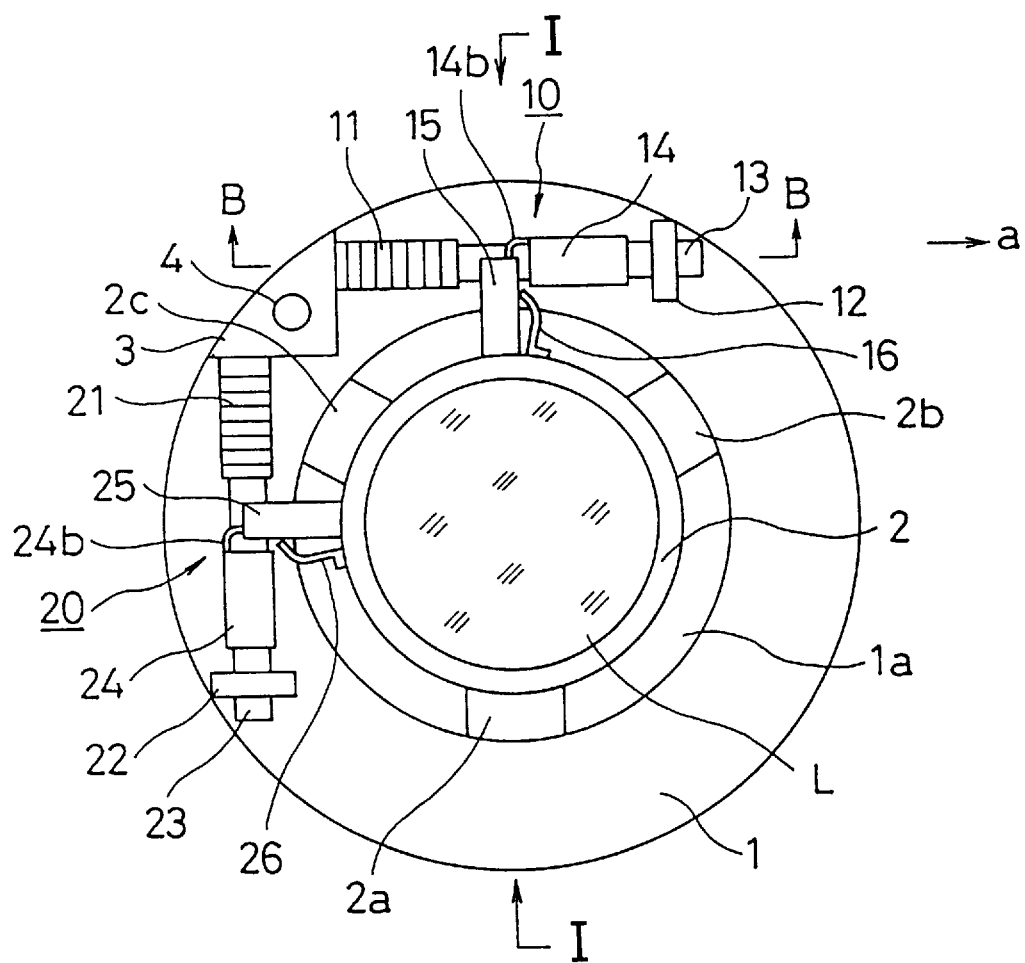
FIG. 2 is a front view of a collecting lens driving mechanism shown in FIG. 1.
Figure 4:
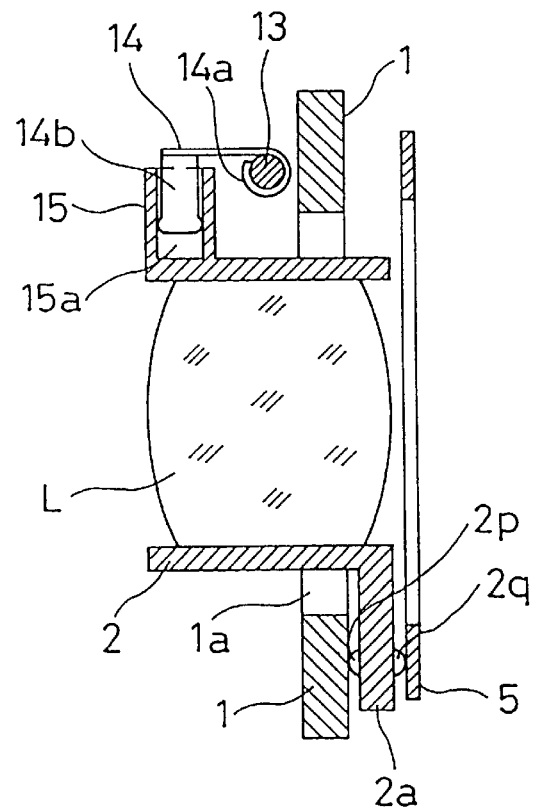
FIG. 4 is a cross-sectional view along A—A line shown in FIG. 2.
Figure 5:
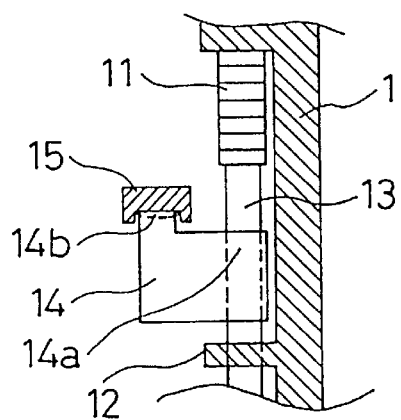
FIG. 5 is a cross-sectional view along B—B line shown in FIG. 2.
Figure 6:
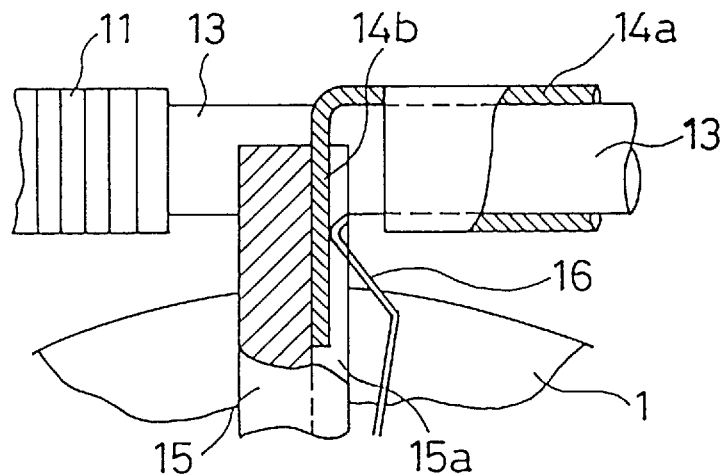
FIG. 6 is a partially enlarged front view of the X-axis actuator shown in FIG. 2.

Preferred embodiments of the present invention will be described in detail hereinafter. FIG.1 is a perspective view of a correction lens driving mechanism for illustrating an image shake correction device of a camera to which the present invention is applied, FIG. 2 is a front view, FIG. 3 is a front view for illustrating a lens-barrel of a correcting lens L, FIG. 4 is a cross-sectional view along I—I line shown in FIG. 2, FIG. 5 is a cross-sectional view along B—B line shown in FIG. 2, and FIG. 6 is a partially enlarged partially cut-away cross-sectional view of the X-axis actuator 10 in FIG. 2.

In FIG. 1 to FIG. 6, a numeral 1 represents a frame for supporting a driving mechanism of a correcting lens which has an opening 1a around the center. A numeral 2 represents a lens-barrel of the correcting lens L, which is positioned in the opening 1a around the center of the frame 1, and is supported movably in X-axis direction and Y-axis direction on a plane perpendicular to the optical axis (Z-axis) by means of an X-axis actuator 10 and Y-axis actuator 20 which are described hereinafter. A support block 3 to which piezoelectric transducers of the X-axis actuator 10 and Y-axis actuator 20 is fixed with adhesive is provided on the frame 1.

The frame 1 is disposed in the lens barrel not shown in the drawing. To move the frame 1 in the optical axis direction with restriction on the position of the frame 1 with respect to the optical axis when the frame 1 is moved in the optical axis direction, a focus guide shaft 4 disposed in parallel to the optical axis is provided in the lens barrel, and a hole 3a to which the focus guide shaft 4 is inserted through is provided on the support block 3.

Figure 3:
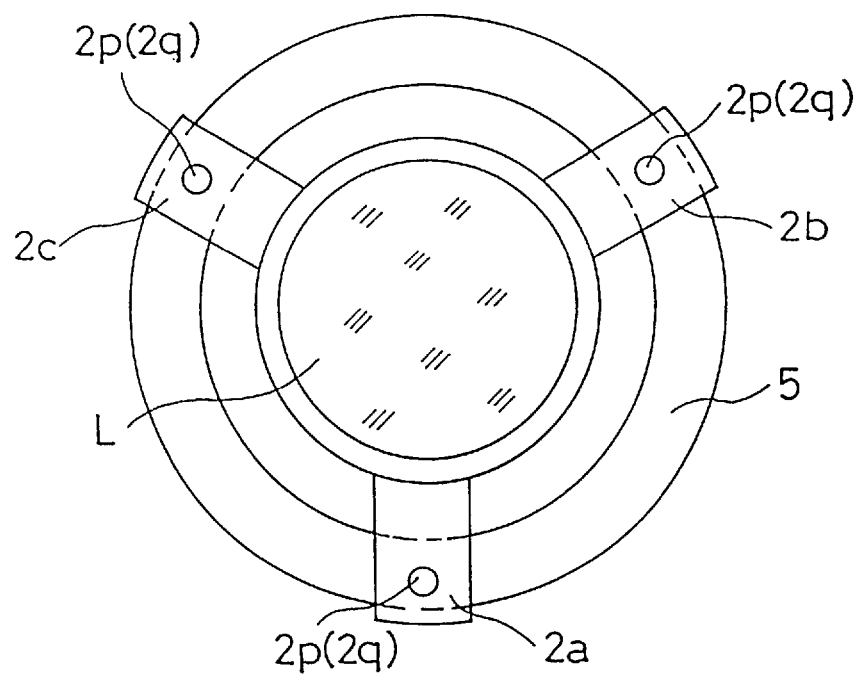
FIG. 3 is a front view of a lens barrel of the correcting lens shown in FIG. 1.

As it is apparent from FIG. 3, three arms 2a, 2b, and 2c which extend radially are formed on the lens barrel 2 of the correcting lens L to maintain the position of the lens barrel 2 with respect to the frame 1. As it is apparent from FIG. 4, each of arms 2a, 2b, and 2c is provided with a projection 2p and 2q respectively on the front face and back face of an arm, and when a disk like press plate 5 presses the arms 2a, 2b, and 2c of the lens barrel 2 against the frame 1, the projections 2p and 2q are brought into contact with the table frame 1 and press plate 5, thus the position of the lens barrel 2 with respect to the frame 1 is maintained. Slight inclination of the lens barrel 2 with respect to the frame 1 can be corrected by adjusting the height of the projection 2p.

Next, the X-axis actuator 10 and Y-axis actuator 20 are described herein under. First, the X-axis actuator 10 is described. The one end of the piezoelectric transducer 11 of the X-axis actuator 10 is fixed with adhesive to the support block 3 on the frame 1, the other end of the piezoelectric transducer 11 is fixed with adhesive to the driving shaft 13, the one end of the driving shaft 13 is supported movably in the parallel direction to X-axis by means of a block 12. The friction coupling member 14a of the movable member 14 is friction-coupled with the driving shaft 13 with a suitable frictional force. The extension 14b which extends from the movable member 14 is engaged with a groove 15a which extends in the direction parallel to Y-axis of an action member 15 formed on the lens barrel 2 of the correcting lens L, and the extension member 14b is pressed onto the action member 15 by means of a presser spring 16. The press force of the extension member 14b by means of the presser spring 16 is prescribed so as to be larger than the force required to move the movable member 14 in X-axis direction.

Because the extension member 14b is movable in Y-axis direction as it is engaged with the groove 15a of the action member 15, when the lens barrel 2 of the correcting lens L moves in Y-axis direction, the extension member 14b moves Y-axis direction on the groove of the action member 15 and does not hinder the motion of the lens barrel 2 in Y-axis direction.

The structure of the portion where the extension 14b of the movable member 14 of the above-mentioned X-axis actuator 10 is engaged with the groove 15a of the action member 15 is apparent with reference to FIG. 4 and FIG. 5. Further, referring to FIG. 6 which is a partially enlarged partially cut-away cross-sectional view of the X-axis actuator 10 shown in FIG. 2, the structure of the contact, where the extension 14b which extends from the movable member 14 is engaged with the groove 15a of the action member 15 formed on the lens barrel 2 of the correcting lens L, and the extension 14b is pressed onto the action member 15 by means of the presser spring 16, is apparent.

Next, the Y-axis actuator 20 is described herein under. The one end of piezoelectric transducer 21 of the Y-axis actuator 20 is fixed with adhesive to the support block 3 on the table frame 1, and on the other end of the piezoelectric transducer 21 is fixed with adhesive to the driving shaft 23, and the one end of the driving shaft is supported movably in the direction parallel to the Y-axis by means of the block 22.

The structure of the Y-axis actuator 20 described herein under is the same as that of the X-axis actuator 10, though components are omitted partially from the drawings, reference characters of components shown in the drawings for describing the X-axis actuator are replaced respectively with reference characters of twenties correspondingly for the Y-axis actuator 20.

The friction coupling member 24a of the movable member 24 is friction-coupled with the driving shaft 23 with suitable frictional force movably in the direction parallel to the Y-axis. The extension 24b which extends from the movable member 24 is engaged with the groove 25a which extends in the direction parallel to the X-axis of the action member 25 formed on the lens barrel 2 of the correcting lens L, and the extension 24b is pressed onto the action member 25 by means of the presser spring 26. The contact force of the presser spring 26 for pressing the extension 24b is prescribed to be sufficiently larger than the force required for moving the movable member in the Y-axis direction.

Because the extension 24b is movable in the X-axis direction as it is engaged with the groove of the action member 25, when the lens barrel 2 of the correcting lens L moves in the X-axis direction, the extension 24b is moved on the groove 25a of the action member 25 in the X-axis direction and does not hinder motion of the lens barrel 2 in the X-axis direction.

Next, operation is described with reference to FIG. 2. Because the X-axis actuator 10 and the Y-axis actuator 20 have the almost same structure, herein only the operation of the X-axis actuator 10 is described, and operation of the Y-axis actuator 20 is omitted.

Figure 14:
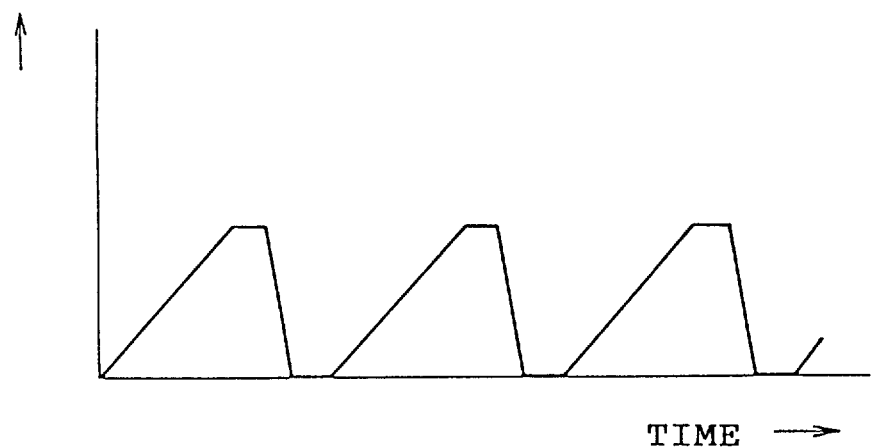
FIG. 14 is a diagram for illustrating an exemplary waveform of driving pulses applied to an electro-mechanical transducer.

Application of driving pulses each of which has a waveform comprising a slow rising portion and subsequent rapid falling portion as shown in FIG. 14 to the piezoelectric transducer 11 causes slow expansion deformation of the piezoelectric transducer 11 corresponding to the slow rising portion of a driving pulse, and the driving shaft 13 is displaced in the direction shown by the arrow-a. Thereby, the movable member 14 and the extension 14b which are friction-coupled with the driving shaft 13 with interposition of the friction coupling member 14a moves in the direction of the arrow-a. Because the extension 14b which is friction-coupled with the driving shaft 13 with interposition of the friction coupling member 14a and the action member 15 are in contact each other with aid of the presser spring 16, and the contact force is prescribed to be larger than the force required for moving the movable member 14 in the axial direction, the extension 14b and the action member 15 moves together in the direction of the arrow-a, and thereby the lens barrel 2 of the correcting lens L coupled with the action member 15 is moved in the direction of the arrow-a (herein X-axis positive direction).

The rapid falling portion of a driving pulse causes quick contraction deformation of the piezoelectric transducer 11 in the thickness direction, and the driving shaft 13 is displaced in the opposite direction to the arrow-a. When, the movable member 14 which is friction-coupled with the driving shaft 13 with interposition of the friction coupling member 14a and the extension 14b both remain substantially at the position because the inertia force overcomes the frictional force between the driving shaft 13 and the movable member 14, the lens barrel 2 of the correcting lens L does not move.

The word "substantially" described herein above means the motion including that the movable member 14 moves slidingly with sliding between the coupling member 14a of the movable member 14 and the driving shaft 13 in the direction of the arrow-a or in the opposite direction, and overall the movable member 14 is displaced in the direction of the arrow-a due to the difference in driving time. The mode of motion is dependent on the given friction condition.

Continuous application of driving pulses having the above-mentioned waveform to the piezoelectric transducer 11 causes continuous movement of the correcting lens L in the X-axis positive direction. Continuous application of driving pulses having a waveform comprising a rapid rising portion and subsequent slow falling portion to the piezoelectric transducer 11 causes continuous movement of the correcting lens L in the X-axis negative direction.

The Y-axis actuator 20 is operated in the same manner as the X-axis actuator 10, and the correcting lens L is moved continuously in the Y-direction.

Figure 7:
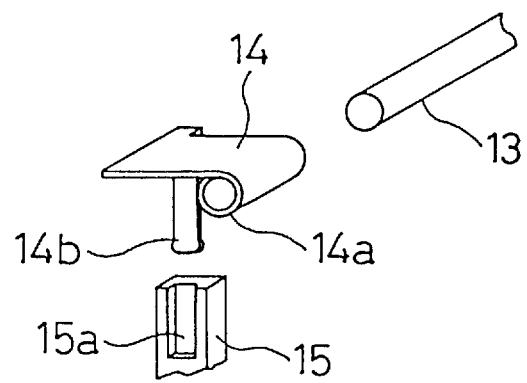
FIG. 7 is a perspective view for illustrating a structure of friction coupling part of a movable member.
Figure 8:
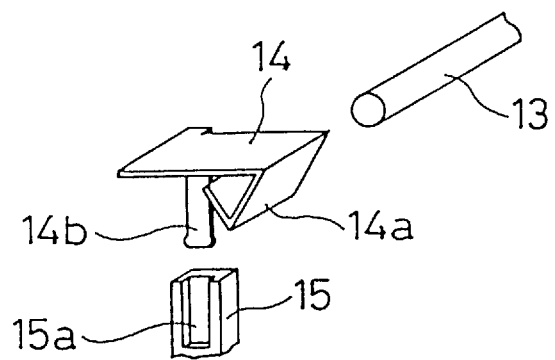
FIG. 8 is a perspective view for illustrating other exemplary structure of friction coupling part of a movable member.
Figure 9:
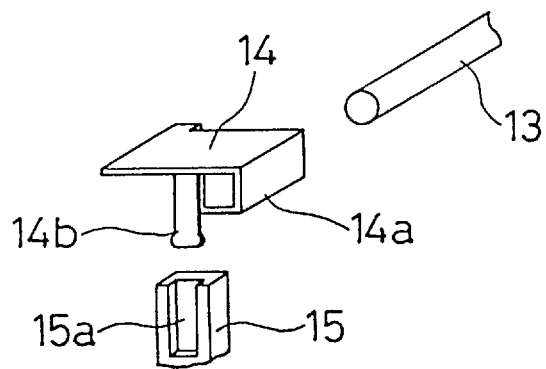
FIG. 9 is a perspective view for illustrating other exemplary structure of friction coupling of a movable member.

In fabrication of the movable member 14 (same manner is applied to the movable member 24) having the above-mentioned structure shown in FIG. 7, the friction coupling member 14a and extension 14b are formed from a single plate of an elastic material such as a metal. In particular, the friction coupling member 14a is formed in a configuration of partially-opened approximately cylindrical shape with a C-shape cross-section having a diameter smaller than that of the driving shaft 13 so that elastic force of this cylinder is sufficient for friction-coupling with the driving shaft 13. Alternately, the friction coupling member 14a of the moving member 14 may have, for example, triangular cross-section as shown in FIG. 8, or square cross-section as shown in FIG. 9 so that elastic force of this component is sufficient for friction coupling.

Though known magneto-resistive sensors described hereinbefore can be used for detection of position of the correcting lens L to be moved in the X-axis direction and the Y-axis direction to correct image shake, in this embodiment, a lens position detection sensor having a structure that a LED (light emitting diode) is attached on the lens barrel 2 of the correcting lens L, the light emitted from the LED is detected with a two-dimensional PSD (photosensitive diode) attached to the frame 1, and thus position in the X-axis direction and Y-axis direction of the correcting lens L is detected, and by employing this structure, the number of required parts can be reduced and the structure is simplified.

A camera shake detection sensor is provided in the camera, and the camera is structured so as to detect camera shake displacement caused in the camera. The camera shake detection sensor comprises of an acceleration sensor for detecting acceleration Ax and Ay in the X-axis direction and the Y-axis direction of the camera. By integrating twice the detected acceleration Ax and Ay with aid of a CPU 52 served for controlling image shake, camera shake displacement Mx and My can be detected.

Figure 10:
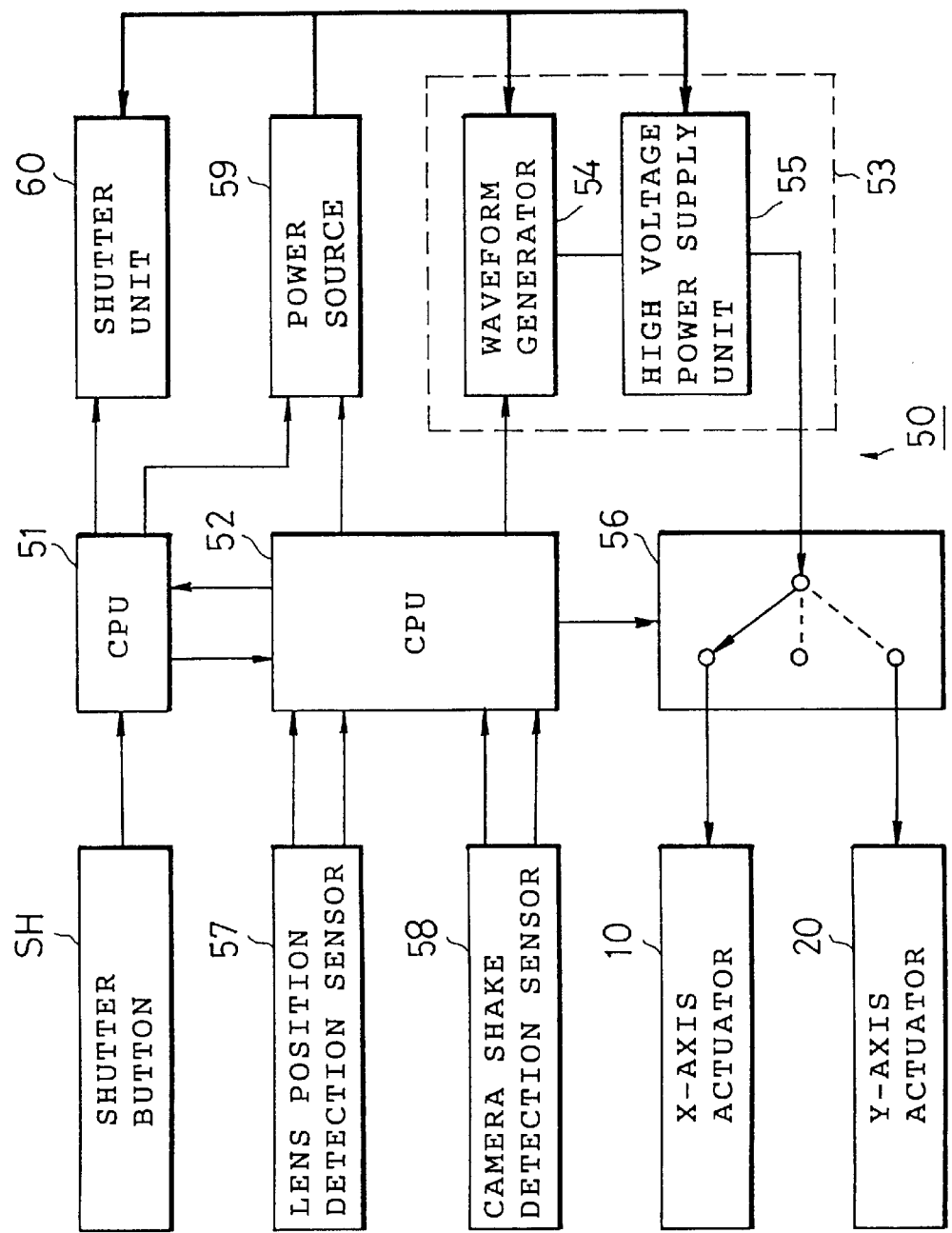
FIG. 10 is a block diagram of a control circuit.

Next, a control circuit is described. FIG. 10 is a block diagram of a control circuit 50 for driving the shutter of the camera and for correcting image shake with aid of the correcting lens. The control circuit 50 is provided with a CPU 51 for performing driving control of the shutter, a shutter release button SH connected to an input port of the CPU 51, and a shutter unit 60 connected to an output port.

The control circuit 50 comprises the CPU 52 for controlling image shake correction with aid of the correcting lens, a lens position detection sensor 57 for detecting the position in the X-axis direction and Y-axis direction of a lens connected to an output port of the CPU 52, a camera shake detection sensor 58 for detecting camera shake displacement of the camera, a driving pulse generator 53 connected to the output port of the CPU 52, and a switching section 56. The driving pulse generator 53 comprises a waveform generator 54 and high voltage power supply unit 55, and the X-axis actuator 10 and Y-axis actuator 20 are connected to the switching section 56. The CPU 51 and CPU 52 are connected so as to communicate signals each other. The control circuit 50 is provided with a power source 59, and the power source supplies power to the shutter unit 60, X-axis actuator 10, and Y-axis actuator 20 for driving.

Figure 11:
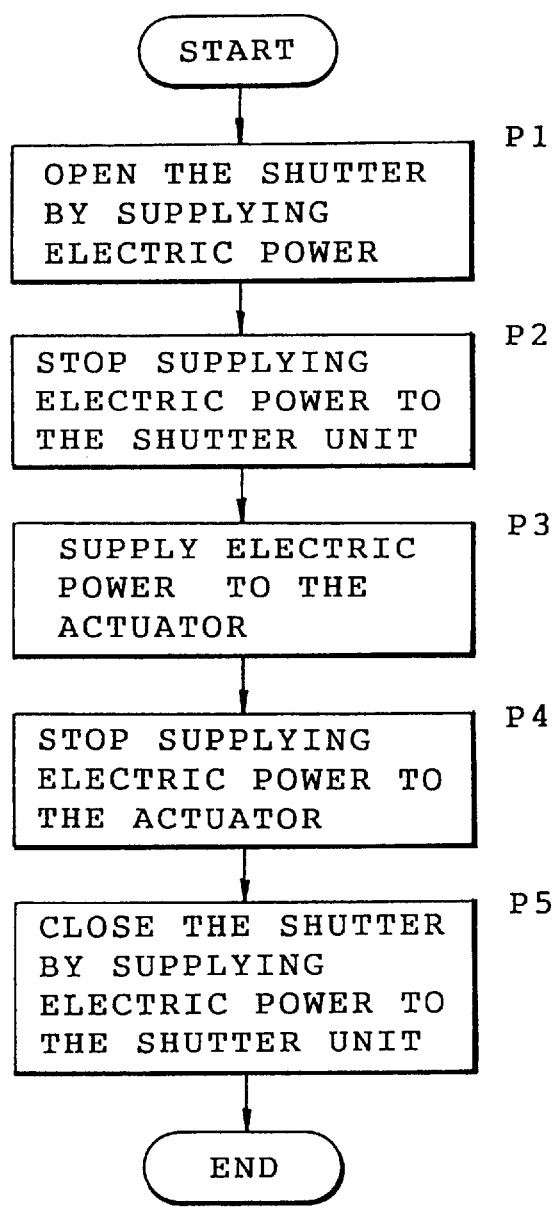
FIG. 11 is a flow chart for describing control operation by a control circuit.
Figure 12:
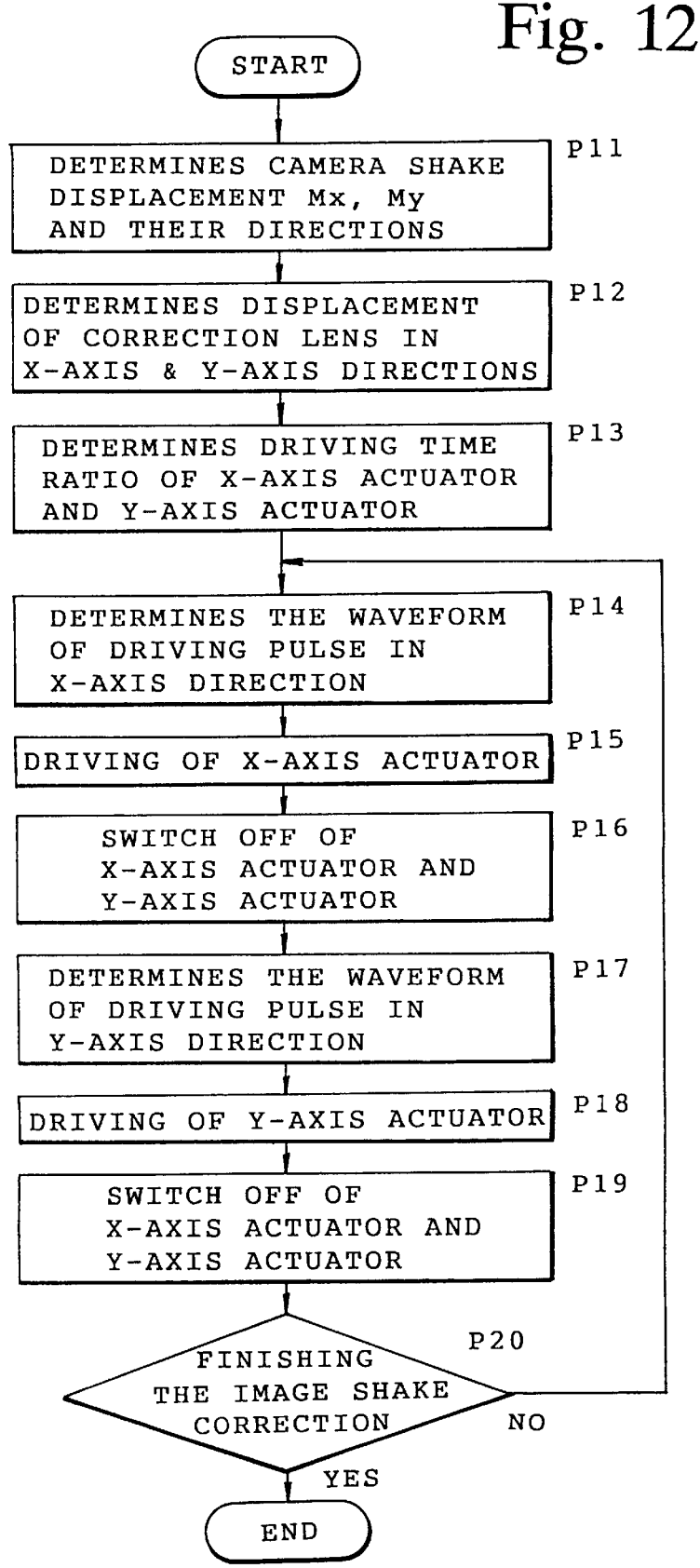
FIG. 12 is a flow chart for describing control operation of the actuator by a control circuit.
Figure 13:
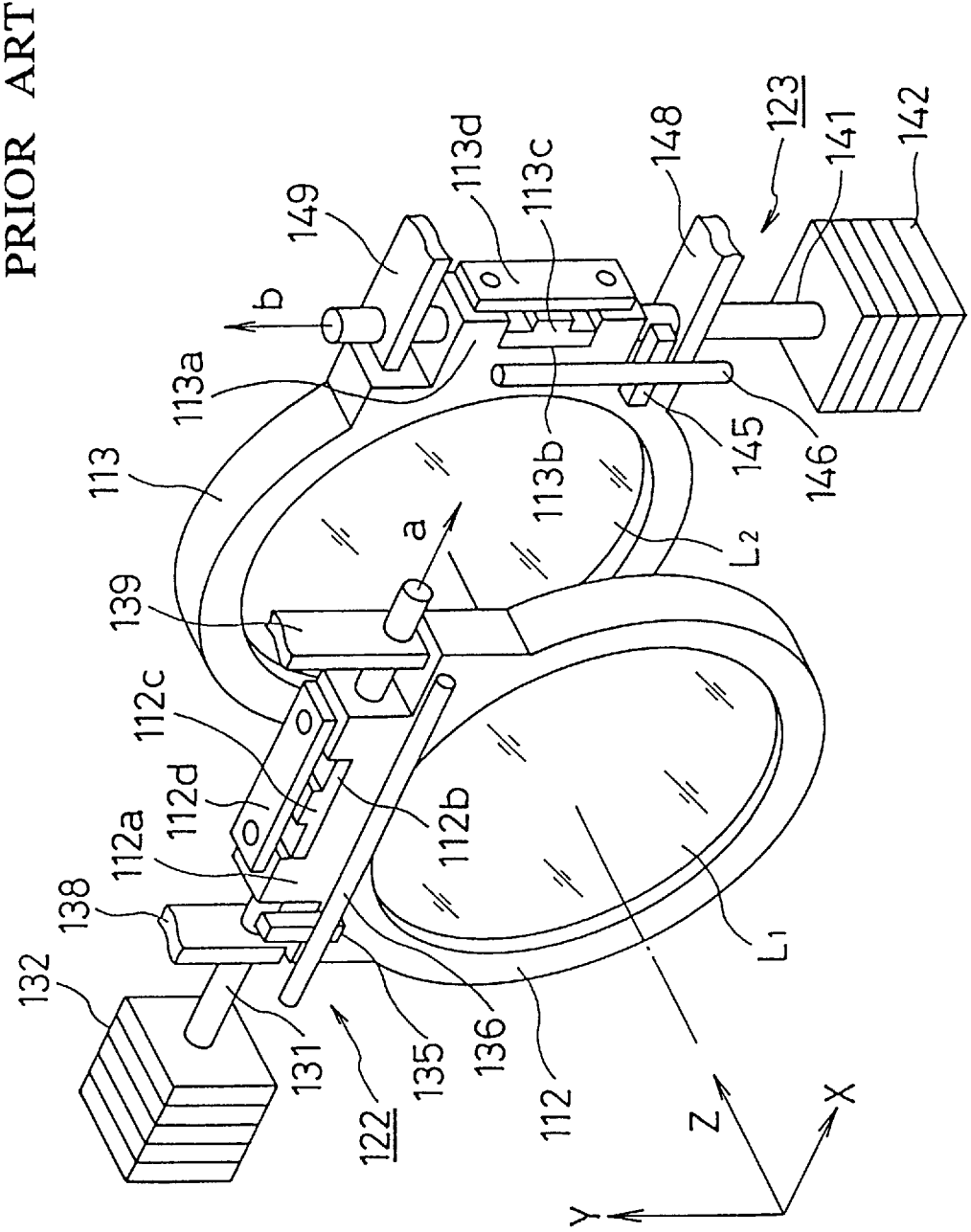
FIG. 13 is a perspective view for illustrating a structure of a conventional image shake correction device.

Next, control operation of the control circuit 50 is described with reference to the control circuit block diagram shown in FIG. 10, and flow charts shown in FIG. 11 and FIG. 12. When the CPU 51 receives a shutter release signal which indicates an operation of the shutter release button SH of the camera not shown in the drawing, the CPU 51 drives a stepping motor (not shown in the drawing) of the shutter unit 60 to open the shutter from the initial state to a predetermined opening position by supplying electric power (step P1, refer to FIG. 11). Because the opening state of the shutter is maintained by the stop torque of the stepping motor, the electric power supply to the stepping motor is brought to a stop after the shutter is opened (step P2), and electric power is supplied to the X-axis actuator and Y-axis actuator 20 through the driving pulse generator 53 and switching section 56 to drive the correcting lens (step P3).

The opening state is maintained for a time required for an exposure, thereafter the electric power supply to the X-axis actuator and Y-axis actuator is brought to a stop (step P4), and electric power is supplied again to the shutter unit 60 to drive the stepping motor to close the shutter (step P5).

Next, image shake correction control with aid of the CPU 52 is described. When the CPU 52 receives signals which indicate acceleration Ax and Ay in the X-axis direction and Y-axis direction outputted from the camera shake detection sensor 58 provided in the camera (not shown in the drawing), the CPU 52 integrates twice the input acceleration Ax and Ay and determines camera shake displacement Mx and My and direction of the displacement (step P11, refer to FIG. 12).

Next, based on lens position correction information such as the determined camera shake displacement Mx and My and direction thereof, and the lens position outputted from the lens position detection sensor 57, driving displacement of the correcting lens in the X-axis direction and Y-axis direction is calculated (step P12), and a ratio of driving time of the X-axis actuator and Y-axis actuator is determined (step P13).

The waveform generator 54 of the driving pulse generator 53 is operated to determine a suitable driving pulse waveform based on driving displacement and driving direction in the X-axis direction, and directs the high voltage power supply unit 55 to output driving pulses having the waveform (step P14). Further, the switching section 56 is operated so that driving pulse outputted from the high voltage power supply unit 55 is supplied to the X-axis actuator 10, the X-axis actuator 10 is operated based on the determined driving time ratio (step P15), the switching section 56 is operated after the driving time is finished to switch off the X-axis actuator 10 and Y-axis actuator 20 from the high voltage power supply unit 55 (step P16).

The waveform generator 54 of the driving pulse generator 53 is operated to determine a suitable driving pulse waveform based on driving displacement and driving direction in the Y-axis direction, and directs the high voltage power supply unit 55 to output the waveform (step P17). Further, the switching section 56 is operated so that driving pulse outputted from the high voltage power supply unit 55 is supplied to the Y-axis actuator 20, the Y-axis actuator 20 is operated based on the determined driving time ratio (step P18), the switching section 56 is operated after the driving time is finished to switch the X-axis actuator 10 and Y-axis actuator 20 off from the high voltage power supply unit 55 (step P19).

While the shutter of the camera is open, the processing from the above-mentioned detection of camera shake displacement to driving of the actuators is repeated quickly until the camera shake displacement Mx and My becomes zero (step 20), the correcting lens is displaced quickly in the direction for correcting camera shake displacement, thereby an image shake on the film is prevented.

According to the above-mentioned control circuit, a single power source is used commonly for driving the correcting lens and also for driving the shutter, and further the circuit for driving the X-axis actuator and Y-axis actuator is used commonly, therefore the number of required parts is reduced and current capacity of the battery is reduced, and thus the space in the camera occupied by components is saved. In the above-mentioned embodiment, the present invention is applied to an image shake correction device, however, the present invention can be applied not only to image shake correction devices for camera but also to various optical devices such as binoculars and projectors in order to correct image shake due to the shake of optical system. The actuator described in the above-mentioned embodiment can be applied not only for driving a lens in an optical system but also for driving devices of other general apparatus.

As described hereinbefore, the embodiment provides an image shake correction device that the lens driving mechanism is driven based on the lens position information corresponding to the camera shake displacement of the camera, and position of the correcting lens provided movably in a plane perpendicular to the optical axis is controlled, and a controller is controlled so as to supply electric power to move the lens driving mechanism while the shutter is open and supply of electric power to the shutter driving means can be brought to a stop.

Operation time ratio of a plurality of lens driving mechanisms is calculated based on lens position correction information, and the controller controls driving pulse outputted from the driving pulse generator so that the driving pulse is supplied to the plurality of lens driving mechanisms alternately dependently on the driving time ratio calculated as described hereinbefore.

Therefore, only a single driving pulse generator may be provided to a plurality of lens driving mechanisms, and also an electric power source with a reduced current capacity can be used because the plurality of lens driving mechanisms are operated not simultaneously, thus the number of required components can be reduced and space in the internal of the camera for circuit boards and electric power source can be reduced, thus the present invention is significantly effective for miniaturization and weight lightening.

What is claimed is:

1. An image shake correction device of an optical system, comprising:
    a correcting lens disposed movably in a plane perpendicular to the optical axis, a plurality of correcting lens driving mechanisms for moving the correcting lens in the X-axis direction and Y-axis direction on the xy-plane perpendicular to the optical axis,
    a driving pulse generation unit for generating driving pulse to move the correcting lens driving mechanism, and
    a control unit for calculating driving time ratio of said plurality of lens driving mechanisms based on lens position information of the correcting lens corresponding to shake displacement of the optical axis, and for supplying driving pulse outputted from the driving pulse generating unit to said plurality of lens driving mechanisms alternately dependently on the calculated driving time ratio.

2. An image shake correction device as claimed in claim 1, wherein said control unit determines a waveform of the driving pulse to be outputted from the driving pulse generating unit based on the lens position correction information.

3. An image shake correction device as claimed in claim 1, wherein said driving pulse generation unit is commonly used for said plurality of lens driving mechanisms.

4. An apparatus having an image shake correction device comprising:
    a correcting lens disposed movably in a plane perpendicular to the optical axis, a plurality of correcting lens driving mechanisms for moving the correcting lens in the X-axis direction and Y-axis direction on the XY-plane perpendicular to the optical axis,
    driving mechanisms for driving other than the correcting lens,
    a power source for supplying power to said plurality of correcting lens driving mechanisms and to said driving mechanisms for driving other than the correcting lens, and
    a control unit for controlling the power source so that power is supplied to said plurality of correcting lens driving mechanisms while power supply to driving mechanisms other than the correcting lens can be brought to a stop.

5. An apparatus having an image shake correction device as claimed in claim 4, wherein said power source provides a driving pulse generating unit for driving plurality of correcting lens driving mechanisms.

6. An apparatus having an image shake correction device as claimed in claim 4, wherein said control unit calculates driving time ratio of said plurality of lens driving mechanisms based on the lens position correction information of the correcting lens and supplies the driving pulse to said plurality of lens driving mechanisms dependently on the calculated driving time ratio.

7. An apparatus having an image shake correction device as claimed in claim 5, wherein said control unit determines a waveform of the driving pulse to be outputted from the driving pulse generation unit based on lens position correction information.

8. An apparatus having an image shake correction device as claimed in claim 5, wherein said driving pulse generation unit is commonly used for said plurality of lens driving mechanisms.

9. An apparatus having an image shake correction device comprising:
    a correcting lens disposed movably in a plane perpendicular to the optical axis;
    a plurality of correcting lens driving mechanisms for moving the correcting lens in the X-axis direction and Y-axis direction on the XY-plane perpendicular to the optical axis;
    a driving pulse generation unit for generating driving pulse to drive said plurality of correcting lens driving mechanisms;
    driving mechanisms for driving other than the correcting lens;
    a power source for supplying power to said driving pulse generation unit and to said driving mechanisms for driving other than the correcting lens; and
    a control unit for calculating driving time ratio of said plurality of lens driving mechanisms based on lens position correction information of the correcting lens corresponding to shake displacement of the apparatus and for controlling the power source so that the driving pulse generation unit supplies driving pulse to said plurality of correcting lens driving mechanisms dependently on the calculated driving time ratio while power supply to driving mechanisms other than the correcting lens can be brought to a stop.

10. The apparatus having an image shake correction device as claimed in claim 9, wherein the driving mechanism for driving other than correcting lens includes a driving mechanism for driving the shutter of a camera.

* * * * *

UNITED STATES PATENT AND TRADEMARK OFFICE
CERTIFICATE OF CORRECTION

PATENT NO. : 5,842,053
DATED : November 24, 1998
INVENTOR(S) : UEYAMA et al.

It is certified that error appears in the above-identified patent and that said Letters Patent is hereby corrected as shown below:

Title page, item [54] and col. 1,

In the Title:   After "DEVICE" (second occurrence) insert --FOR--

Title page, item [75]
Under Inventors: Change "Kanabara" to --Kanbara--

Title page, item [30]
Under Foreign Application
Priority Data:
          Change "8-212781" to --8-212181--

Column 3, line 8,
Under Description
of Drawings:    Change "A-A" to --I-I--

Signed and Sealed this

Eighth Day of February, 2000

Attest:

Attesting Officer

Q. TODD DICKINSON

Commissioner of Patents and Trademarks